(12) United States Patent  
Tsuzuki

(10) Patent No.: US 9,391,426 B2  
(45) Date of Patent: Jul. 12, 2016

(54) RAMAN AMPLIFIER AND GAIN CONTROL METHOD

(71) Applicant: FUJITSU LIMITED, Kawasaki-shi, Kanagawa (JP)

(72) Inventor: Tatsuya Tsuzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/693,959

(22) Filed: Apr. 23, 2015

(65) Prior Publication Data

US 2015/0229098 A1    Aug. 13, 2015

Related U.S. Application Data

(63) Continuation of application No. PCT/JP2012/078545, filed on Nov. 2, 2012.

(51) Int. Cl.  
*H01S 3/30* (2006.01)  
*H01S 3/13* (2006.01)  
*H04B 10/291* (2013.01)  
*H04B 10/294* (2013.01)  
*H04J 14/02* (2006.01)  
(Continued)

(52) U.S. Cl.  
CPC .............. *H01S 3/302* (2013.01); *H01S 3/1301* (2013.01); *H01S 3/1305* (2013.01); *H04B 10/294* (2013.01); *H04B 10/2916* (2013.01); *H04B 10/2942* (2013.01); *H04B 10/564* (2013.01); *H04J 14/0221* (2013.01); *G02F 2203/585* (2013.01); *H01S 3/094096* (2013.01); *H04Q 2213/13295* (2013.01)

(58) Field of Classification Search  
CPC ..... H01S 3/302; H01S 3/1302; H01S 3/1305; H01S 3/0941; H01S 3/1301; H01S 3/06754  
See application file for complete search history.

(56) References Cited

U.S. PATENT DOCUMENTS 6,292,288 B1    9/2001    Akasaka et al.  
6,624,926 B1    9/2003    Hayashi et al.  
(Continued)

FOREIGN PATENT DOCUMENTS

JP    2000-98433    4/2000  
JP    2001-7768    1/2001  
(Continued)

OTHER PUBLICATIONS

International Search Report and Written Opinion of the International Searching Authority (Form PCT/ISA/210, Form PCT/ISA/237), mailed in connection with PCT/JP2012/078545 and mailed Dec. 11, 2012 (7 pages).

(Continued)

*Primary Examiner* — Eric Bolda  
(74) *Attorney, Agent, or Firm* — Fujitsu Patent Center

(57) ABSTRACT

A Raman amplifier includes: a pump light generator that provides a plurality of pump light beams with different wavelengths for an optical transmission medium; a gain monitor that monitors an average Raman gain in the optical transmission medium; a storage unit that stores ratio information indicating a ratio of power of the plurality of pump light beams for a specified gain characteristic with respect to an average Raman gain in the optical transmission medium; and a controller that controls the power of the plurality of pump light beams based on the average Raman gain monitored by the gain monitor and the ratio information.

6 Claims, 14 Drawing Sheets

(51) Int. Cl.
*H04B 10/564* (2013.01)
*H01S 3/067* (2006.01)
*H01S 3/094* (2006.01)

(56) References Cited

U.S. PATENT DOCUMENTS

| | | |
|---|---|---|
| 2003/0117694 A1 | 6/2003 | Sobe et al. |
| 2004/0252999 A1 | 12/2004 | Onaka et al. |
| 2005/0024712 A1* | 2/2005 | Hiraizumi ............ H01S 3/06754 359/334 |
| 2005/0099676 A1 | 5/2005 | Tokura et al. |
| 2008/0158658 A1 | 7/2008 | Sugaya |
| 2009/0190205 A1 | 7/2009 | Onaka et al. |
| 2009/0190206 A1 | 7/2009 | Onaka et al. |
| 2011/0013267 A1* | 1/2011 | Griseri .................... H01S 3/302 359/334 |
| 2011/0141552 A1* | 6/2011 | Ghera ................ H04B 10/2942 359/334 |

FOREIGN PATENT DOCUMENTS

| | | |
|---|---|---|
| JP | 2002-72262 | 3/2002 |
| JP | 2003-140208 | 5/2003 |
| JP | 2004-193640 | 7/2004 |
| JP | 2006-189465 | 7/2006 |
| JP | 2008-182679 | 8/2008 |
| JP | 2009-177074 | 8/2009 |

OTHER PUBLICATIONS

JPOA—Office Action of Japanese Patent Application No. 2014-544187 dated May 17, 2016, with English translation of the relevant part p. 1, line 22 to end of p. 2.

* cited by examiner

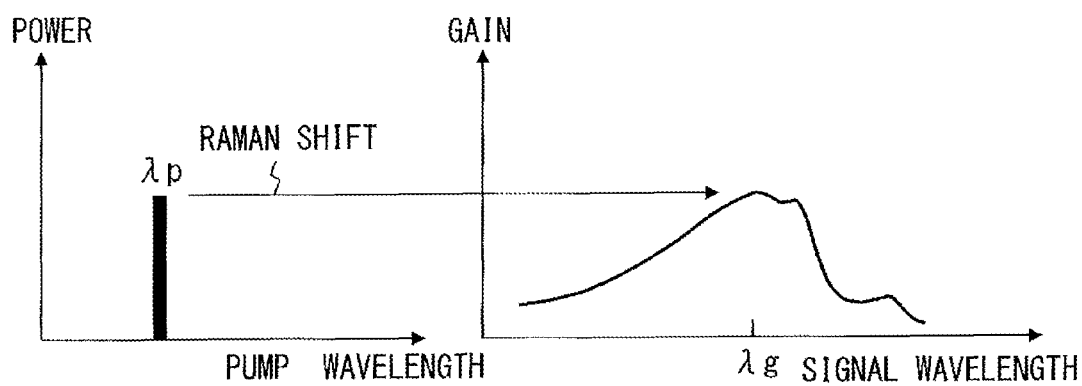
F I G. 1

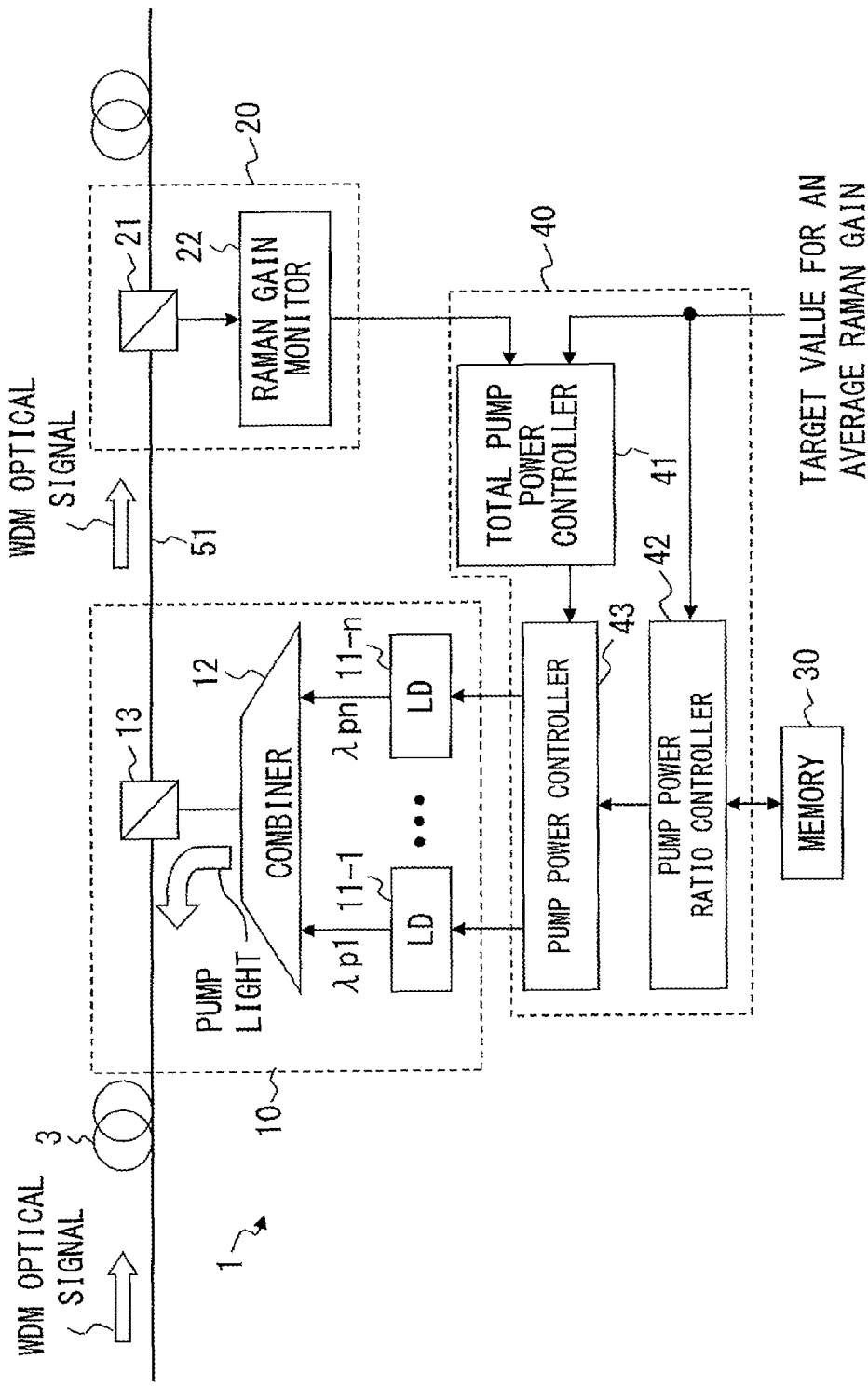
F I G. 5

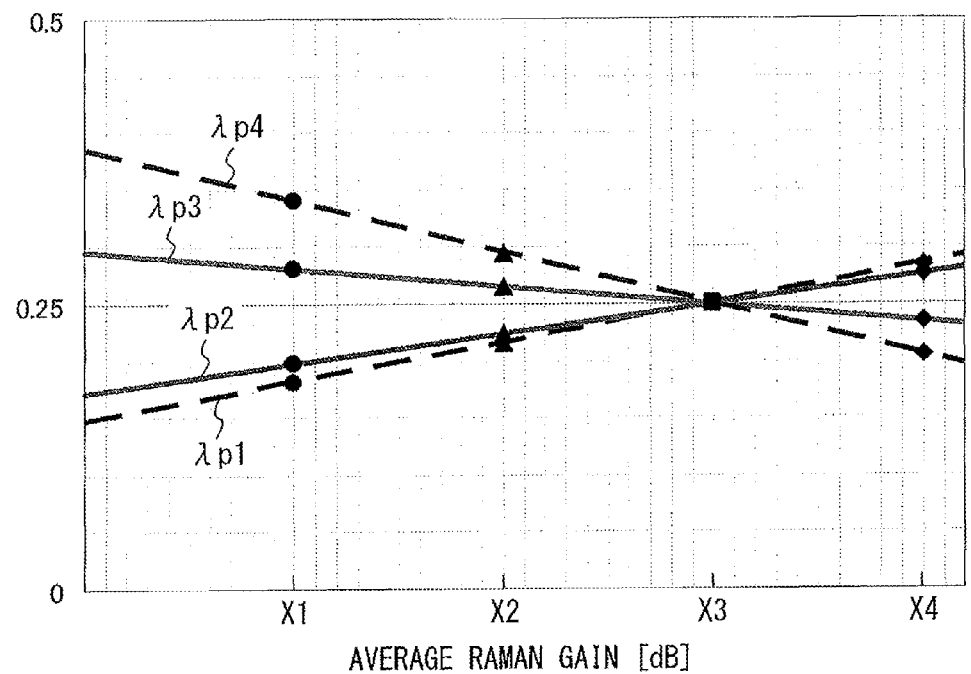
F I G. 6

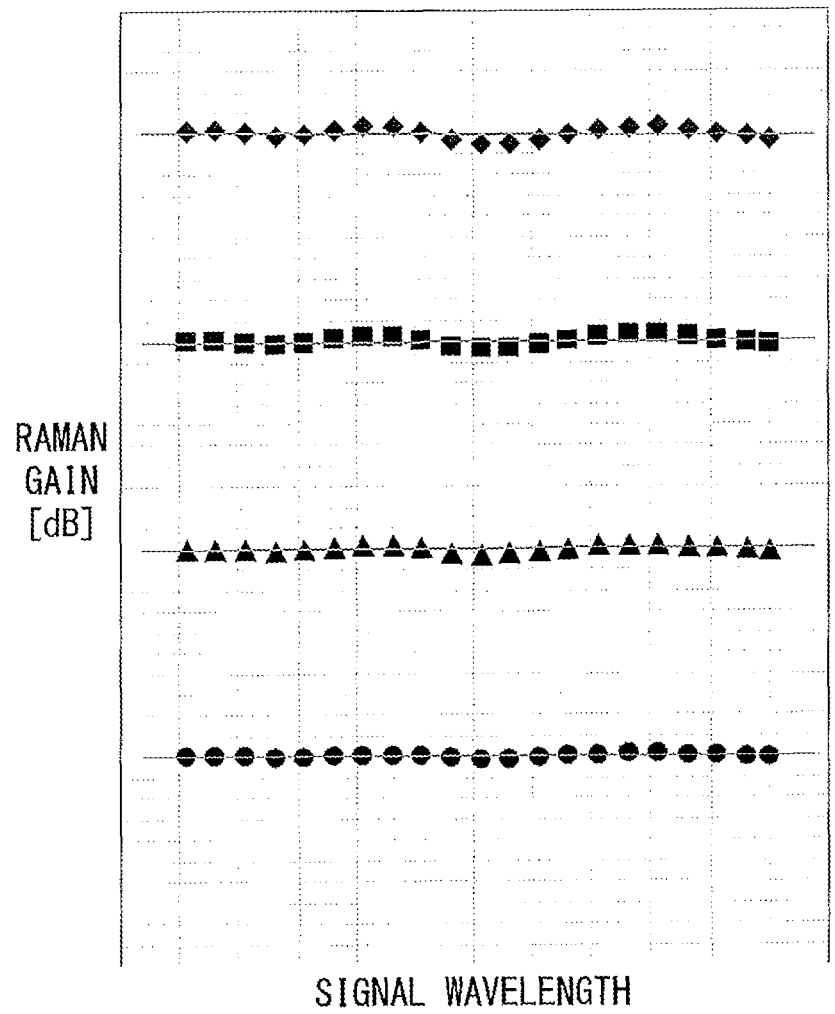
F I G. 7

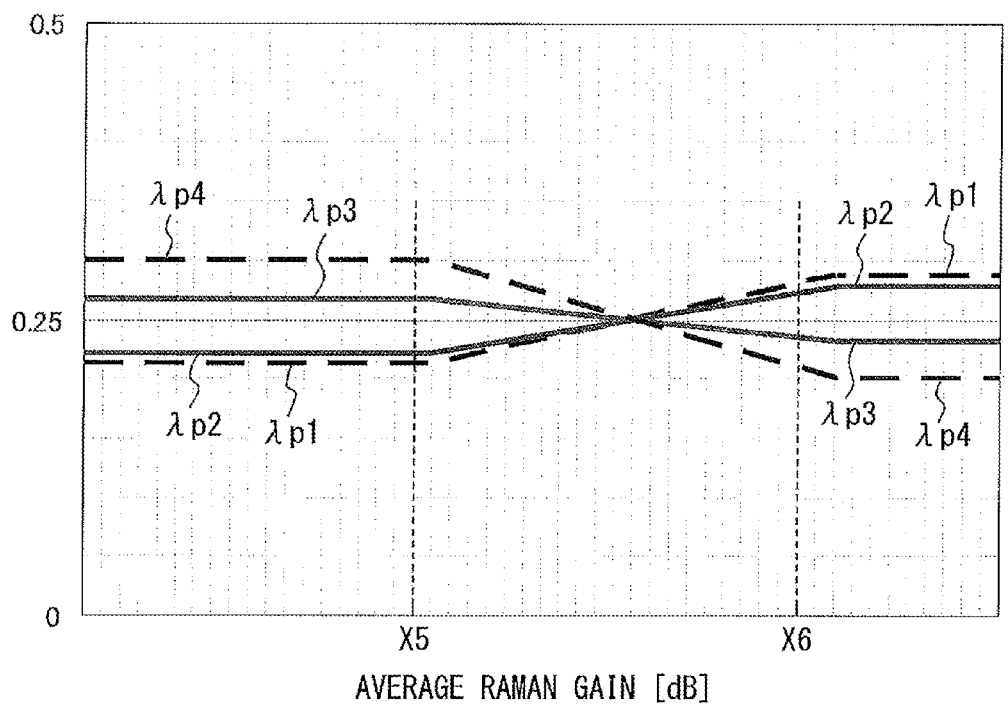
F I G. 9

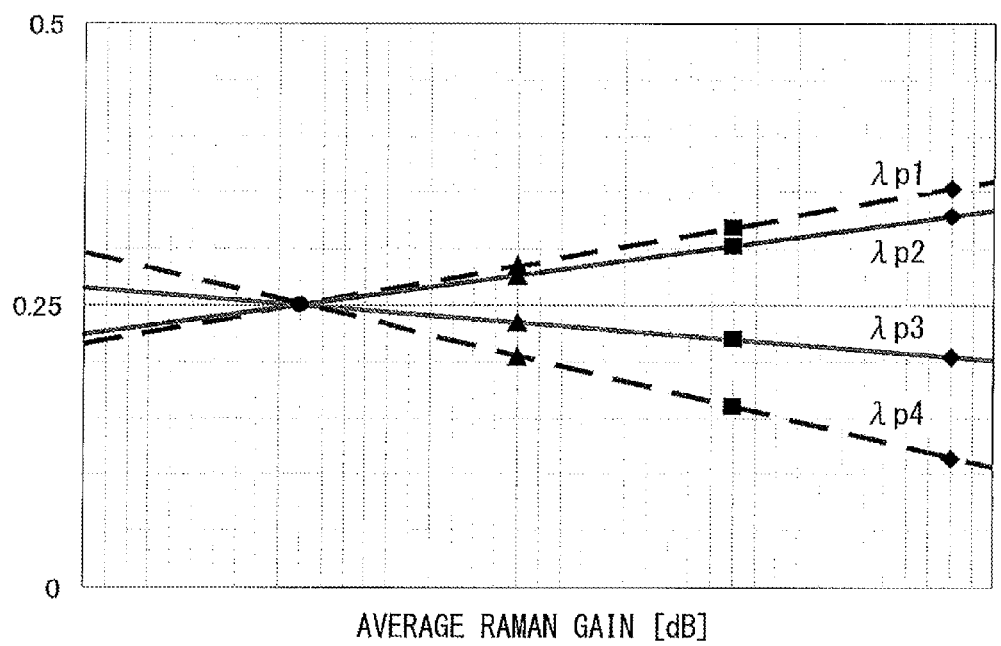
F I G. 1 1

RAMAN AMPLIFIER AND GAIN CONTROL METHOD

CROSS-REFERENCE TO RELATED APPLICATION

This application is a continuation application of International Application PCT/JP2012/078545 filed on Nov. 2, 2012 and designated the U.S., the entire contents of which are incorporated herein by reference.

FIELD

The embodiments discussed herein are related to a Raman amplifier and a method for controlling the gain of a Raman amplifier.

BACKGROUND

Recently, an optical network using a WDM (wavelength division multiplexing) transmission technique has been implemented to realize a large capacity communication. Also to realize a long distance transmission, a low noise optical amplifier is requested. Accordingly, a Raman amplification has been put into practical use as one of low noise optical amplifying methods in a long distance WDM transmission system.

The Raman amplification is realized by providing pump light for an optical transmission line which operates as an optical amplification medium. A Raman gain occurs on the wavelength shifted by a specified Raman shift with respect to the pump light. When a WDM optical signal is amplified, it is preferable that a gain is flat with respect to a wavelength in the signal wavelength band of the WDM optical signal. Therefore, the pump wavelength of the Raman amplification is determined so that, for example, the gain may be flat with respect to the wavelength in the signal wavelength band.

When the signal wavelength band is wide, a Raman amplifier having a wide wavelength band in which a gain is flat with respect to a wavelength is requested. To satisfy the request, a Raman amplifier having a plurality of different pump wavelengths has been proposed. In this Raman amplifier, for example, an amplified WDM optical signal is divided into a plurality of wavelength bands, and the optical power of each wavelength band is monitored. Then, the power of each of the plurality of pump wavelengths is controlled so that the optical power of each of the wavelength bands may be equal or substantially equal.

Note that the related technologies are described in, for example, Japanese Laid-open Patent Publication No. 2002-72262, Japanese Laid-open Patent Publication No. 2000-98433, Japanese Laid-open Patent Publication No. 2004-193640, and Japanese Laid-open Patent Publication No. 2008-182679.

In the Raman amplifier having a plurality of pump wavelengths, a plurality of monitor circuits are required to obtain equalized or substantially equalized optical power of each channel of a WDM optical signal as described above. Therefore, the production cost of the Raman amplifier becomes high.

SUMMARY

According to an aspect of the embodiments, a Raman amplifier includes: a pump light generator that provides a plurality of pump light beams with different wavelengths for an optical transmission medium; a gain monitor that monitors an average Raman gain in the optical transmission medium; a storage unit that stores ratio information indicating a ratio of power of the plurality of pump light beams for a specified gain characteristic with respect to an average Raman gain in the optical transmission medium; and a controller that controls the power of the plurality of pump light beams based on the average Raman gain monitored by the gain monitor and the ratio information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates the relationship between the pump light and the gain in Raman amplification;

FIG. 5 illustrates a configuration of a Raman amplifier according to an embodiment of the present invention;

FIG. 6 illustrates an example of ratio information;

FIG. 7 illustrates a Raman gain obtained by the Raman amplifier according to the embodiment of the present invention;

FIG. 9 illustrates an example of ratio information when the operation range of a pump light source is restricted;

FIG. 11 illustrates an example of ratio information for implementing the wavelength characteristic illustrated in FIG. 10;

DESCRIPTION OF EMBODIMENTS

A Raman amplifier provides pump light for an optical transmission line (optical transmission medium). Thus, the optical transmission line works as a Raman amplification medium. That is, the Raman amplifier generates a Raman gain by providing pump light for the optical transmission line.

FIG. 1 illustrates the relationship between the pump light and the gain in Raman amplification. To realize the Raman amplification, the pump light is provided for a Raman amplification medium. The Raman amplification medium is an optical transmission line (that is, an optical fiber) which propagates an optical signal.

When the pump light is provided for the Raman amplification medium, a wavelength λg with which a Raman gain is generated is shifted toward the long wavelength side by Δλ with respect to the wavelength λp of the pump light. Therefore, the optical signal is efficiently amplified if pump light having a wavelength shorter by Δλ than the wavelength of the light propagating the signal. The Δλ may be referred to as a Raman shift amount, and depends on the material of an amplification medium.

In the following description the wavelength of pump light may be referred to as a "pump wavelength", the wavelength at which a Raman gain is obtained by pump light may be referred to as a "gain wavelength", and the wavelength of the light propagating a signal may be referred to as a "signal wavelength".

When a WDM optical signal is amplified, a Raman amplifier having a wide wavelength band in which a gain is flat with respect to a wavelength is requested. To satisfy the request, a Raman amplifier with a plurality of different pump wavelengths has been proposed.

Figure 2:
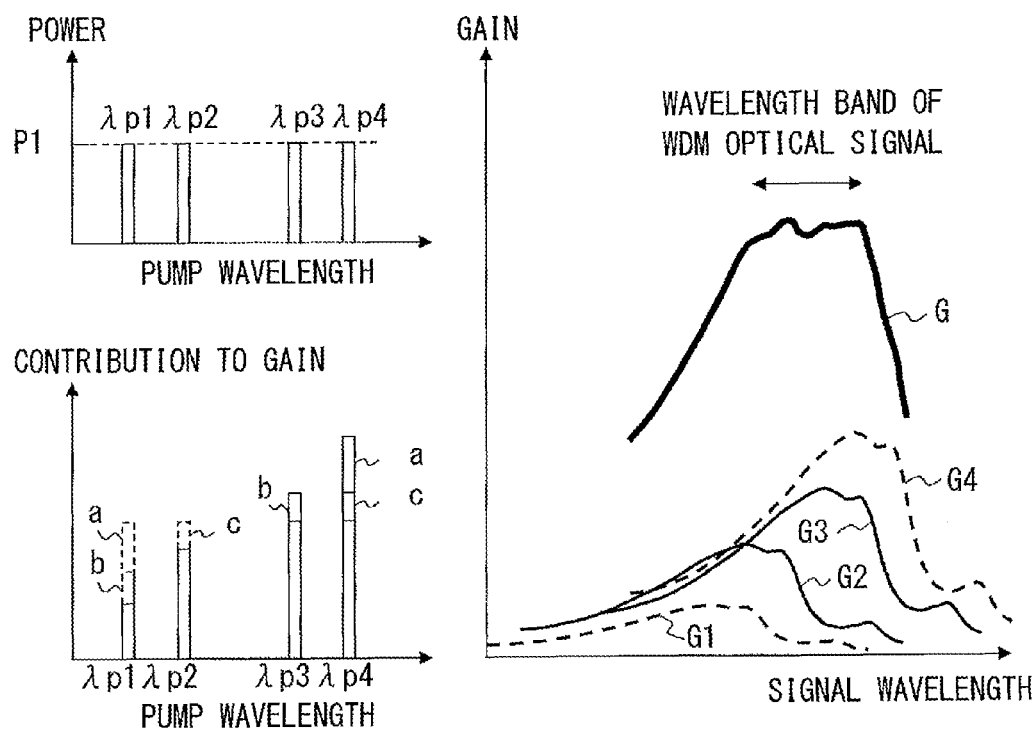
FIG. 2 illustrates an operation of a Raman amplifier which obtains a flat gain using a plurality of pump wavelengths.

FIG. 2 illustrates an operation of a Raman amplifier which obtains a flat gain using a plurality of pump wavelengths. In the example illustrated in FIG. 2, four pump wavelengths (λp1 through λp4) are used.

The Raman amplifier provides each pump light beams for a Raman amplification medium. By so doing, a Raman gain is obtained by respective pump lights in the Raman amplification medium. That is, a Raman gain G1 is obtained by pump light beam λp1. Similarly, Raman gains G2 through G4 are obtained respectively by pump light beams λp2 through λp4. The Raman gain G is a sum of the Raman gains G1 through G4 obtained by the pump light beams λp1 through λp4 in the Raman amplification medium. Therefore, Raman amplification that provides a flat gain with respect to a wavelength is realized by appropriately adjusting the allocation of the pump light wavelengths λp1 through λp4 and the power of the pump light beams λp1 through λp4.

In the Raman amplification, light of a long wavelength is amplified by light of a short wavelength. Therefore, in the Raman amplifier with a plurality of pump wavelengths, pump light of a long wavelength may be amplified by pump light of a short wavelength. In the embodiment illustrated in FIG. 2, the pump light 43 is amplified by the pump light λp1. The pump light λp4 is amplified by the pump light λp1 and the pump light λp2. In this case, a part of the energy of the pump light λp1 is given to the pump light 43 and the pump light λp4. Similarly, a part of the energy of the pump light λp2 is given to the pump light λp4. As a result, in the example illustrated in FIG. 2, the contribution of the pump light λp1 to the Raman gain decreases by "a+b" and the contribution of the pump light λp2 to the Raman gain decreases by "c" due to Raman amplification between the pump light beams. Note that the contribution of the pump light λp3 to the Raman gain increases by "b", and the contribution of the pump light λp4 to the Raman gain increases by "a+c".

Therefore, when a plurality of pump wavelengths are used, pump light of a long wavelength tends to more contributes to the Raman gain G, and pump light of a short wavelength tends to less contributes to the Raman gain G. In the example illustrated in FIG. 2, the input power of the pump light beams λp1 through λp4 are substantially equal to one another, but the pump light λp4 contributes the most to the Raman gain G, while the pump light λp1 contributes the least to the Raman gain G.

The Raman amplifier may amplify an optical signal according to a specified average Raman gain (or a target value for the average Raman gain). When a large average Raman gain is specified, the Raman amplifier increases the power of respective pump light beams according to the specified average Raman gain. On the other hand, when a small average Raman gain is specified, the Raman amplifier decreases the power of respective pump light beams according to the specified average Raman gain. The average Raman gain indicates in this specification the ratio of the power of the optical signal output from the Raman amplification medium when no pump light is provided for the Raman amplification medium and the power of the optical signal output from the Raman amplification medium when pump light is provided for the Raman amplification medium.

However, when the power of each pump light beam is controlled to adjust the average Raman gain, the contribution of each pump light beam to the Raman gain G is changed. When the contribution of each pump light beam to the Raman gain G is changed, the shape of the spectrum of the Raman gain is changed. That is, the Raman gain may be non-flat with respect to a wavelength. The problem is described below with reference to FIGS. 2 and 3.

In the case illustrated in FIG. 2, the power of each of the pump light beams λp1 through λp4 is P1. By providing the pump light beams λp1 through λp4 for the Raman amplification medium, a flat gain is obtained in the wavelength band of the WDM optical signal.

Figure 3:
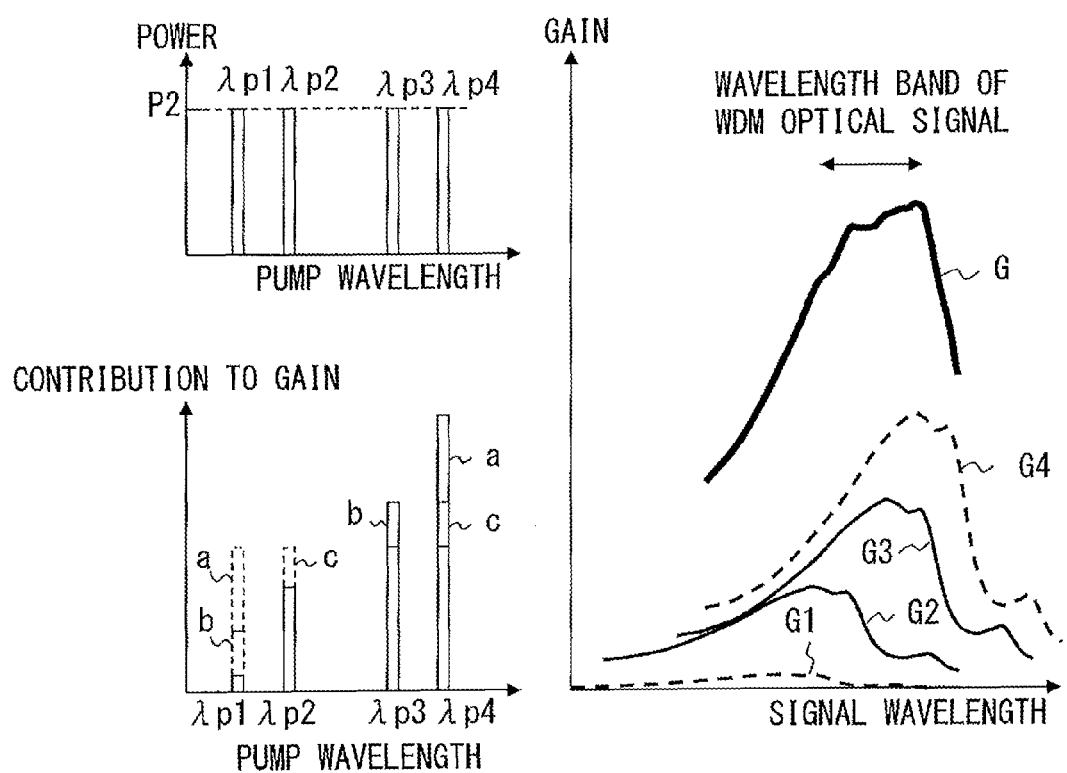
FIG. 3 illustrates the problem of the Raman amplifier with a plurality of pump wavelengths.

In the case illustrated in FIG. 3, as compared with the case illustrated in FIG. 2, a larger average Raman gain is requested. Therefore, the Raman amplifier controls the input power of each of the pump light beams λp1 through λp4 as P2. The power P2 is larger than the power P1.

In the Raman amplification with a plurality of pump wavelengths, pump light of a long wavelength is amplified by pump light of a short wavelength as described above. In this case, when the power of each pump light beam increases, the energy which is transferred between pump light beams also increases. Therefore, in the case illustrated in FIG. 3, as compared with the case illustrated in FIG. 2, the contribution of the pump light λp1 to a Raman gain further decreases, and the contribution of the pump light λp4 to the Raman gain further increases. As a result, the Raman gain G becomes low on the short wavelength side and high on the long wavelength side as illustrated in FIG. 3.

Figure 4:
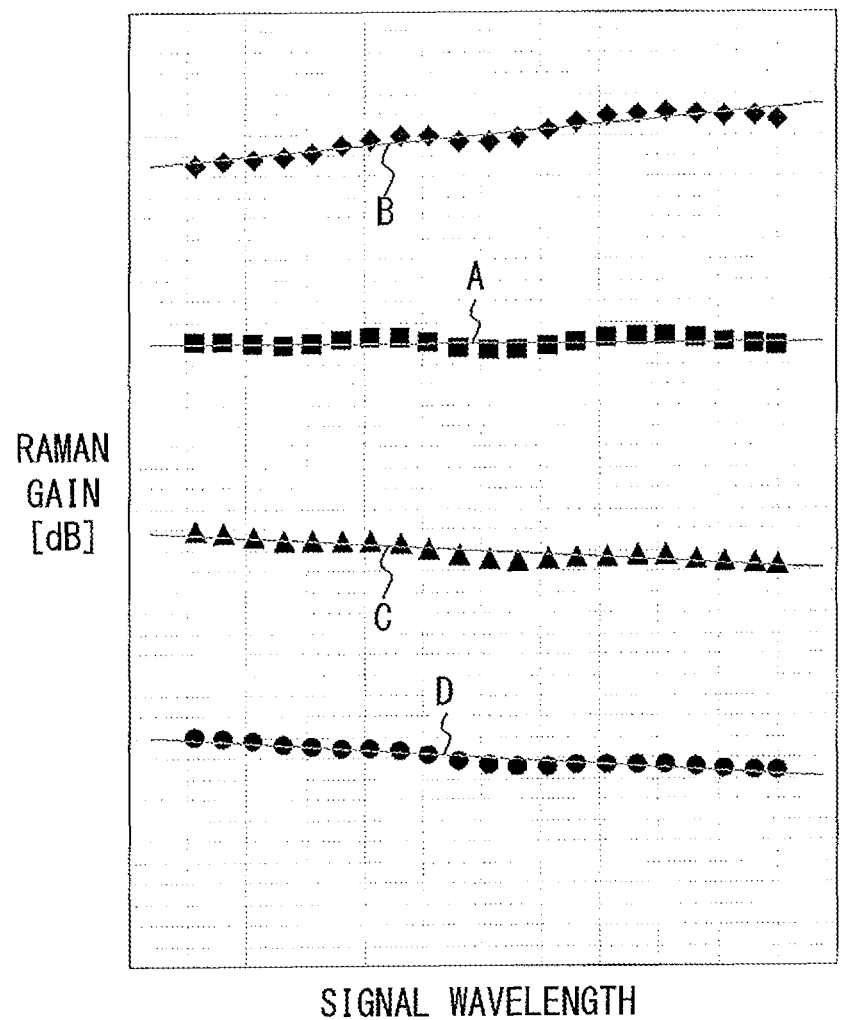
FIG. 4 illustrates the relationship between the average Raman gain and the wavelength characteristic of a Raman gain.

FIG. 4 illustrates the relationship between the average Raman gain and the wavelength characteristic of a Raman gain. The Raman gain illustrated in FIG. 4 is obtained by the Raman amplifier with a plurality of pump wavelengths.

As described above, when the allocation of the plurality of pump wavelengths and the power of each pump light beam are appropriately determined, a flat Raman gain is obtained with respect to a wavelength. In the example illustrated in FIG. 4, the characteristic A indicates a flat gain with respect to a wavelength.

To increase an average Raman gain, the Raman amplifier increases the power of each pump light beam. Here, it is assumed that the Raman amplifier does not change the ratio of the powers of the pump light beams. In this case, as expressed as the characteristic B, the Raman gain is low on the short wavelength side and the Raman gain is high on the long wavelength side with respect to the center of the gain band. That is, the Raman gain has a positive tilt with respect to the wavelength.

On the other hand, to decrease the average Raman gain, the Raman amplifier decreases the power of each pump light beam. Here, it is also assumed that the Raman amplifier does not change the ratio of the power of each pump light beam. In this case, as expressed as the characteristic C or D, the Raman gain becomes high on the short wavelength side and the raga becomes low on the long wavelength side with respect to the center of the gain band. That is, the Raman gain has a negative tilt with respect to the wavelength.

When the gain of the optical amplifier is not flat with respect to the wavelength, the quality of the WDM optical signal amplified by the optical amplifier is degraded. For example, as compared with the channel which belongs to a wavelength band of a high gain, the S/N ratio of the optical signal of a channel which belongs to a wavelength band of a low gain becomes low. That is, the quality of each channel of the WDM optical signal is not equalized.

To solve this problem, the Raman amplifier according to the embodiment of the present invention has the function of controlling the ratio of a plurality of pump light beams depending on the average Raman gain. The Raman amplifier according to an embodiment of the present invention is described below with reference to the attached drawings.

FIG. 5 illustrates a configuration of a Raman amplifier according to an embodiment of the present invention. A Raman amplifier 1 illustrated in FIG. 5 provides pump light for an optical transmission line (optical transmission medium) 3. Thus, the optical transmission line 3 works as a Raman amplification medium. That is, the Raman amplifier 1 realizes Raman amplification by providing pump light for the optical transmission line 3.

Although the optical transmission line 3 is not specifically restricted, it is realized by, for example, a single mode fiber (SMF) or a dispersion shift fiber (DSF). However, the optical transmission line 3 may be an optical fiber of another type.

In the embodiment, a WDM optical signal is transmitted through the optical transmission line 3. The optical transmission line 3 works as a Raman amplification medium when pump light is provided as described above. Therefore, the WDM optical signal is amplified when the signal is propagated through the optical transmission line 3.

As illustrated in FIG. 5, the Raman amplifier 1 includes a pump light generation unit 10, a gain monitor unit 20, memory 30, and a controller 40. Then, the Raman amplifier 1 realizes Raman amplification by providing pump light for the optical transmission line 3.

The pump light generation unit 10 includes a plurality of pump light sources 11-1 through 11-$n$, an optical combiner 12, and an optical combiner 13. The pump light generation unit 10 generates a plurality of pump light beams having different wavelengths and provides the pump light beams for the optical transmission line 3.

The pump light sources (LD) 11-1 through 11-$n$ generate light beams with different wavelengths. The wavelengths of the light beams generated by the pump light sources 11-1 through 11-$n$ are respectively expressed as $\lambda p1$ through $\lambda pn$. The light generated by each of the pump light sources 11-1 through 11-$n$ is used as pump light. In the following descriptions, the light generated by the pump light sources 11-1 through 11-$n$ may be referred to as pump light (or pump light beams) $\lambda p1$ through $\lambda pn$ respectively. In addition, the wavelengths of light beams generated by the pump light sources 11-1 through 11-$n$ may be referred to as pump wavelengths $\lambda p1$ through $\lambda pn$ respectively.

The optical power of each of the pump light sources 11-1 through 11-$n$ is controlled by the controller 40. That is, the power of each of pump light beams $\lambda p1$ through $\lambda pn$ is controlled by the controller 40. Each of the pump light sources 11-1 through 11-$n$ is, for example, a laser light source.

An optical combiner 12 combines the pump light beams $\lambda p1$ through $\lambda pn$ generated by the pump light sources 11-1 through 11-$n$. The optical combiner 12 is not specifically restricted, but may be realized by a well known technology. Otherwise, the optical combiner 12 may be implemented by an existing optical device.

An optical combiner 13 guides the pump light beams $\lambda p1$ through $\lambda pn$ combined by the optical combiner 12 to the optical transmission line 3. In this embodiment, the optical combiner 13 is equipped with three optical ports a through c. The optical port a is optically coupled to the optical transmission line 3. The optical port b is optically couples to an optical fiber 51. The pump light beams $\lambda p1$ through $\lambda pn$ combined by the optical combiner 12 are input to the optical port c. Then, the optical combiner 13 guides the input light of the optical port c to the optical port a. Therefore, the pump light beams $\lambda p1$ through $\lambda pn$ combined by the optical combiner 12 are provided for the optical transmission line 3 by the optical combiner 13. Note that the pump light beams $\lambda p1$ through $\lambda pn$ are input to the optical transmission line 3 so that the pump light beams may be propagated in the opposite direction of the propagation direction of the WDM optical signal.

The optical combiner 13 guides the input light of the optical port a to the optical port b. Therefore, the WDM optical signal amplified in the optical transmission line 3 is guided to the optical fiber 51. The optical fiber 51 guides the output light of the optical port b to the gain monitor unit 20. That is, the WDM optical signal amplified in the optical transmission line 3 is guided to the gain monitor unit 20 by the optical combiner 13 and the optical fiber 51.

The gain monitor unit 20 includes an optical splitter 21 and a Raman gain monitor 22. The gain monitor unit 20 monitors an average Raman gain in the optical transmission line 3.

The optical splitter 21 branches the WDM optical signal transmitted through the optical fiber 51, and guides the branched portion of the WDM optical signal to the Raman gain monitor 22. That is, the optical splitter 21 branches the WDM optical signal amplified in the optical transmission line 3, and guides the branched portion of the WDM optical signal to the Raman gain monitor 22. The optical splitter 21 is not specifically restricted, but is realized by a well known technology. Otherwise, the optical splitter 21 may be implemented by an existing optical device.

The Raman gain monitor 22 detects the power of the WDM optical signal branched by the optical splitter 21. In this case, the Raman gain monitor 22 includes a photo detector such as a photodiode and the like, and detects the optical power of the wavelength band of the WDM optical signal. The Raman gain is expressed as a ratio of the power of the WDM optical signal when pump light is provided for the optical transmission line 3 to the power of the WDM optical signal when no pump light is provided for the optical transmission line 3. Therefore, the Raman gain monitor 22 measures the power of the WDM optical signal when no pump light is provided for the optical transmission line 3 before monitoring the Raman gain, and memorizes the measured value. Then, the Raman gain monitor 22 measures the power of the WDM optical signal while the pump light is provided for the optical transmission line 3, and detects a Raman gain.

The Raman gain monitor 22 may measure a Raman gain periodically. Although the Raman amplifier 1 is not illustrated in the attached drawings, but may include an optical filter which passes the wavelength band of the WDM optical signal between the optical splitter 21 and the Raman gain monitor 22.

The memory 30 stores ratio information that indicates a ratio of the power of the pump light beams $\lambda p1$ through $\lambda pn$ to obtain a specified gain characteristic (or gain pattern) with respect to the average Raman gain in the optical transmission line 3. The embodiment of the ratio information is described later in detail. The memory 30 may be included in the controller 40.

The controller 40 includes a total pump power controller 41, an pump power ratio controller 42, and an pump power controller 43. The controller 40 controls the power of the pump light beams λp1 through λpn according to the average Raman gain monitored by the gain monitor unit 20 and the ratio information stored in the memory 30. In the embodiment, it is assumed that a target value for an average Raman gain is given to the Raman amplifier 1. The target value for an average Raman gain is determined by, for example, a user of an optical transmission system or a network administrator, and is given to the controller 40.

The total pump power controller 41 calculates the difference between the target value for an average Raman gain and the average Raman gain measured by the Raman gain monitor 22. Then, the total pump power controller 41 calculates the total of the power of the pump light beams λp1 through λpn (total pump light power) based on the difference. In this case, the total pump power controller 41 updates the total pump light power value so that the average Raman gain measured by the Raman gain monitor 22 may approach the target value for an average Raman gain. For example, when the average Raman gain measured by the Raman gain monitor 22 is lower than the target value for an average Raman gain, the total pump power controller 41 increases the total pump light power value by a specified amount. On the other hand, when the average Raman gain measured by the Raman gain monitor 22 is higher than the target value for an average Raman gain, the total pump power controller 41 decreases the total pump light power value by the specified amount. Note that the total pump light power value may be used as control information for the pump power controller 43.

The pump power ratio controller 42 acquires the ratio information corresponding to the target value for an average Raman gain from the memory 30. Then, the pump power ratio controller 42 gives the ratio information to the pump power controller 43.

The pump power controller 43 controls the power of the pump light beams λp1 through λpn according to the total pump light power value calculated by the total pump power controller 41 and the ratio information obtained from the memory 30. An example is given below. In this example, it is assumed that the pump light beams λp1 through λp4 are generated in the pump light generation unit 10. It is also assumed that the total pump light power value calculated by the total pump power controller 41 is 400 mW. Furthermore, it is assumed that the ratio information corresponding to the target value for an average Raman gain is described as follows.
(λp1, λp2, λp3, λp4)=(0.25, 0.25, 0.25, 0.25)
In this case, the power of the pump light beams λp1 through λp4 is expressed as follows.
(λp1, λp2, λp3, λp4)=(100 mW, 100 mW, 100 mW, 100 mW)

The pump power controller 43 controls the pump light sources 11-1 through 11-n based on the calculation result. That is, the pump power controller 43 drives the pump light sources 11-1 through 11-n to realize the pump light power calculated as described above. By so doing, the pump light sources 11-1 through 11-n respectively generate the pump light beams λp1 through λp4 with the power specified by the pump power controller 43. The generated pump light beams λp1 through λp4 are provided for the optical transmission line 3.

The controller 40 may be implemented by a digital signal processing circuit including a processor. In this case, the processor executes a program that describes the above-mentioned process (or the process of the flowchart illustrated later in FIG. 12) to provide the functions of the total pump power controller 41, the pump power ratio controller 42, and the pump power controller 43. Note that the controller 40 may include a hardware circuit which realizes a part of the above-mentioned functions.

As described, in the Raman amplifier 1 illustrated in FIG. 5, a feedback system controls an average Raman gain so that the gain may approach its target value. In addition, a plurality of pump light beams are generated at a power ratio corresponding to the target value for an average Raman gain. When the power ratio of the plurality of pump light beams is changed, the wavelength characteristic of the Raman gain (that is, the shape of the spectrum of the Raman gain) is also changed. Furthermore, the power ratio of the pump light beams corresponding to the average Raman gain is expressed as the ratio information. Therefore, the Raman amplifier 1 may provide the wavelength characteristic of a specified Raman gain with respect to the average Raman gain by preparing appropriate ratio information.

FIG. 6 illustrates an example of ratio information. In this embodiment, the pump light generation unit 10 includes four pump light sources 11-1 through 11-4, and generates the pump light beams λp1 through λp4.

The ratio information illustrated in FIG. 6 schematically represents the relationship between the average Raman gain and the pump light power ratio to obtain the flat Raman gain with respect to the wavelength. The relationship is obtained by performing a measurement in advance using the Raman amplifier 1 and the optical transmission line 3. In this case, for example, a power ratio for a flat Raman gain is searched for while adjusting the power of the pump light beams λp1 through λp4 with respect to a plurality of average Raman gain value. The relationship between the average Raman gain and the pump light power ratio may be obtained in another method. For example, the relationship may be obtained by a simulation and the like by considering the type, the material, and the like of the fiber of the optical transmission line 3. Note that in this specification, it is assumed that the word "flat" includes "substantially flat".

The ratio information may be realized by a table which stores the power ratio of the pump light beams λp1 through λp4 with respect to an average Raman gain as an index. In this case, the pump power ratio controller 42 may obtain the corresponding pump light power ratio by searching the table using a specified average Raman gain value. When the specified average Raman gain value is not set as an index, for example, the pump light power ratio may be calculated by interpolation. The ratio information may be realized by a mathematical expression that indicates the relationship illustrated in FIG. 6. In this case, the pump power ratio controller 42 may obtain the corresponding pump light power ratio by assigning the average Raman gain value to the mathematical expression.

The pump light power ratio is expressed as the ratio of each pump light beam to the total power of the pump light beams λp1 through λp4. For example, the following pump power ratio is obtained for the average Raman gain=X1 (for example, 5.2 dB).
(λp1, λp2, λp3, λp4)=(0.1814, 0.1977, 0.2806, 0.3404)
The following pump power ratio is obtained for the average Raman gain=X2 (for example, 10.4 dB).
(λp1, λp2, λp3, λp4)=(0.2157, 0.2238, 0.2653, 0.2952)
The following pump power ratio is obtained for the average Raman gain=X3 (for example, 15.6 dB).
(λp1, λp2, λp3, λp4)=(0.25, 0.25, 0.25, 0.25)
The following pump power ratio is obtained for the average Raman gain=X4 (for example, 20.8 dB).
(λp1, λp2, λp3, λp4)=(0.2843, 0.2762, 0.2347, 0.2048)

In the Raman amplifier 1, when the ratio information illustrated in FIG. 6 is stored in the memory 30, the controller 40 drives the pump light sources 11-1 through 11-n as follows. For simple explanation in this example, it is assumed that the total pump light power required to obtain the average Raman gain X1, X2, X3, and X4 is 100 mW, 200 mW, 300 mW, and 400 mW respectively. It is also assumed that the average Raman gain by the Raman amplifier 1 matches the target value for an average Raman gain by the feedback system.

When X1 (for example, 5.2 dB) is assigned as an target value for an average Raman gain, the controller 40 drives the pump light sources 11-1 through 11-n as follows. The output power of each of the pump light sources 11-1 through 11-4 is obtained by multiplying the total pump light power by the ratio information.
($\lambda$p1, $\lambda$p2, $\lambda$p3, $\lambda$p4)=(18.14 mW, 19.77 mW, 28.06 mW, 34.04 mW)

When X2 (for example, 10.4 dB) is assigned as an target value for an average Raman gain, the controller 40 drives the pump light sources 11-1 through 11-n as follows.
($\lambda$p1, $\lambda$p2, $\lambda$p3, $\lambda$p4)=(43.14 mW, 44.76 mW, 50.06 mW, 59.04 mW)

When X3 (for example, 15.6 dB) is assigned as an target value for an average Raman gain, the controller 40 drives the pump light sources 11-1 through 11-n as follows.
($\lambda$p1, $\lambda$p2, $\lambda$p3, $\lambda$p4)=(75 mW, 75 mW, 75 mW, 75 mW)

When X4 (for example, 20.8 dB) is assigned as an target value for an average Raman gain, the controller 40 drives the pump light sources 11-1 through 11-n as follows.
($\lambda$p1, $\lambda$p2, $\lambda$p3, $\lambda$p4)=(113.72 mW, 110.48 mW, 93.88 mW, 81.92 mW)

FIG. 7 illustrates the wavelength characteristic of a Raman gain obtained by the Raman amplifier 1. In this example, the ratio information illustrated in FIG. 6 is used. In the Raman amplifier 1, the power ratio of a plurality of pump light beams is controlled depending on the specified average Raman gain as described above. Therefore, although an average Raman gain provided by the Raman amplifier 1 is changed, the Raman gain is flat with respect to the wavelength. As a result, the variance of the quality of each channel of the WDM optical signal (for example, the optical S/N ratio) may be suppressed.

Furthermore, the Raman amplifier 1 controls the power of a plurality of pump light beams based on the average Raman gain with respect to the WDM optical signal. The average Raman gain may be monitored by one photo detector. That is, the Raman amplifier 1 monitors an average Raman gain for a WDM optical signal by one photo detector, and controls the plurality of pump light beams using the average Raman gain. Therefore, as compared with the configuration of measuring a Raman gain for each of a plurality of wavelengths in the wavelength band of the WDM optical signal, the Raman amplifier 1 includes a smaller number of optical devices for monitoring optical power, thereby successfully reducing a necessary cost.

Figure 8:
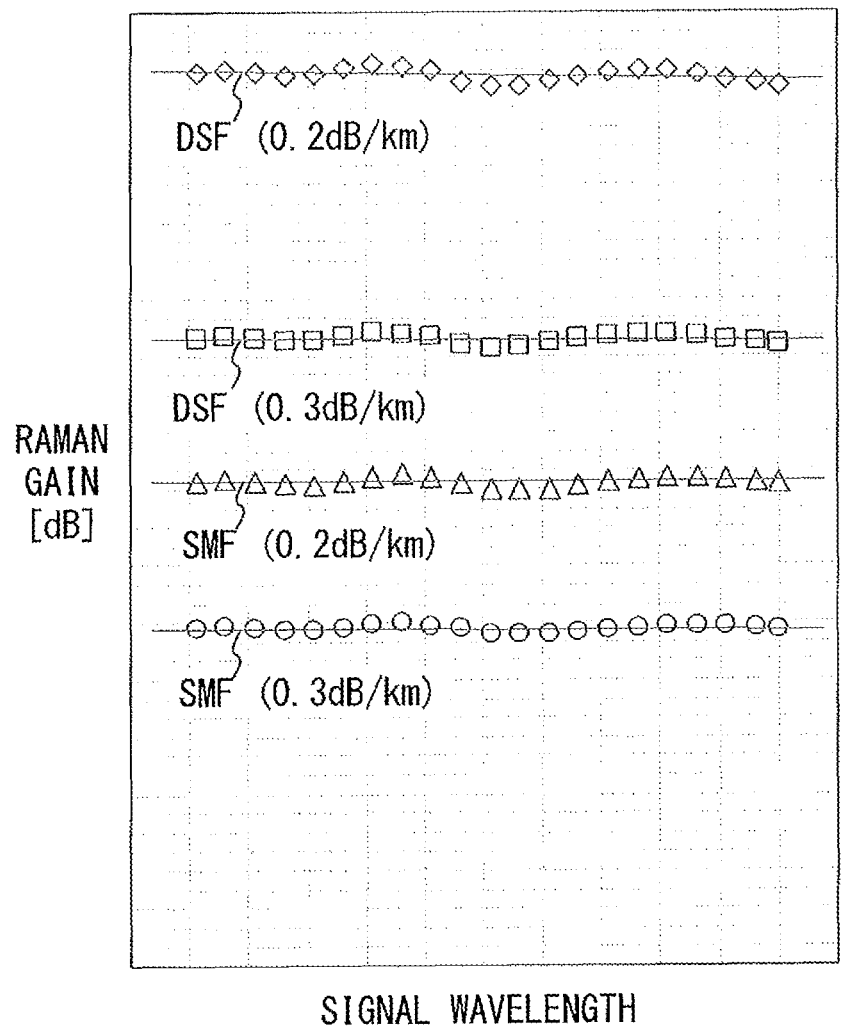
FIG. 8 illustrates Raman amplification obtained by optical fibers having different characteristics.

When the ratio information is prepared corresponding to the type and characteristic of optical fibers, the Raman amplifier 1 may acquire a flat Raman gain in any optical transmission line. For example, the wavelength characteristics of the Raman gain by the Raman amplifier 1 for the cases in which the optical transmission line 3 is realized by a dispersion shift fiber (loss coefficient of 0.2 dB/km), a dispersion shift fiber (loss coefficient of 0.3 dB/km), a single mode fiber (loss coefficient of 0.2 dB/km, and a single mode fiber (loss coefficient of 0.3 dB/km) are illustrated in FIG. 8.

When, for example, a semiconductor laser is used as each of the pump light sources 11-1 through 11-n, the upper and/or lower limit may be specified. For example, in the example illustrated in FIG. 9, the power of the pump light $\lambda$p1 has reached the specified lower limit power at the average Raman gain=X5. In addition, at the average Raman gain=X6, the power of the pump light $\lambda$p1 has reached the specified upper limit power. In this case, the ratio information as illustrated in FIG. 6 is generated for the area where the average Raman gain is X5 through X6. In the area where the average Raman gain is smaller than X5, the power ratio of the pump light beams $\lambda$p1 through $\lambda$p4 is constant. Similarly, in the area where the average Raman gain is larger than X6, the power ratio of the pump light beams $\lambda$p1 through $\lambda$p4 is constant.

In the above-mentioned embodiment, the power of a plurality of pump light beams is controlled so that a flat Raman gain with respect to a wavelength may be obtained. Note that the Raman amplifier 1 according to the embodiment may provide a requested gain characteristic by appropriately generating ratio information.

For example, when the wavelength characteristic of an optical amplifier other than a Raman amplification medium or an optical device on an optical transmission line (hereafter referred to as the other wavelength characteristic) is known, the wavelength characteristic of the gain of the Raman amplifier 1 may offset the other wavelength characteristic. For example, it is assumed that the other wavelength characteristic has larger loss at shorter wavelength in the wavelength band of a WDM optical signal, and it has smaller loss at longer wavelength in the wavelength band of a WDM optical signal. In this case, when the gain of the Raman amplifier 1 indicates the wavelength characteristic illustrated in FIG. 10, the wavelength characteristic of the gain of the Raman amplifier 1 offsets the other wavelength characteristic. Therefore, in the optical transmission system including the Raman amplifier 1, the optical power of each channel of the WDM optical signal is equalized or substantially equalized.

Figure 10:
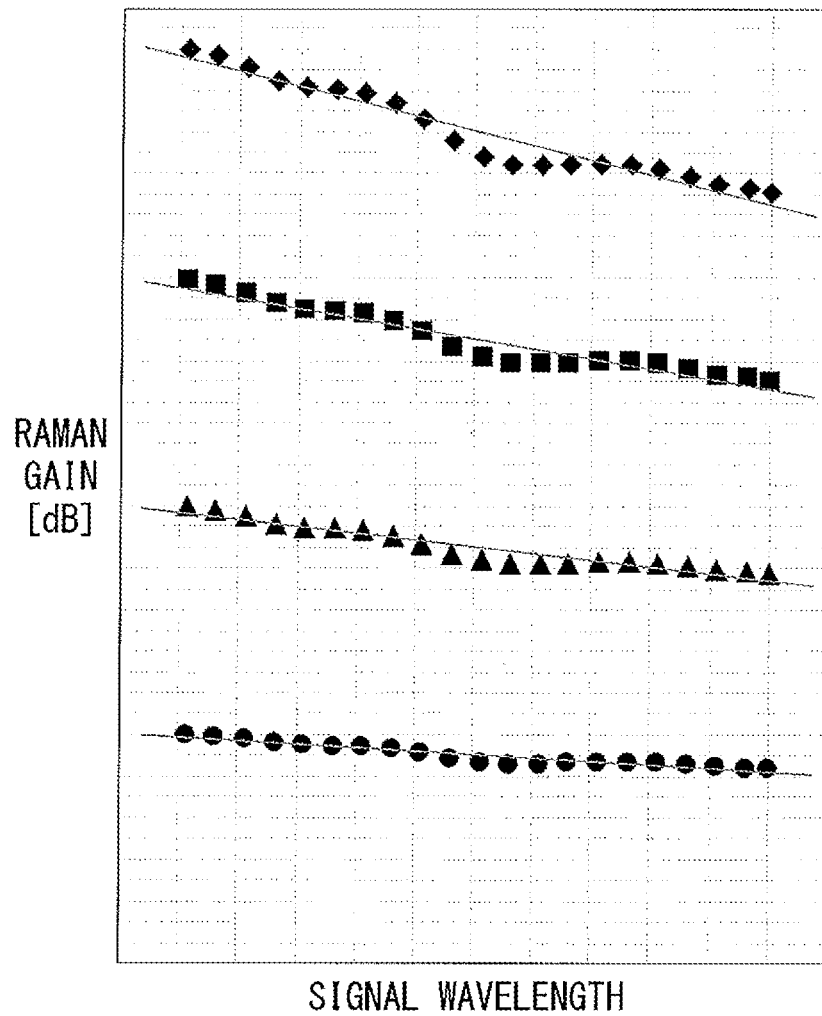
FIG. 10 illustrates a Raman gain having a tilt with respect to a wavelength.

FIG. 11 illustrates an example of the ratio information for the wavelength characteristic illustrated in FIG. 10. That is, the ratio information illustrated in FIG. 11 schematically illustrates the relationship between the average Raman gain and the pump light power ratio for a Raman gain having a negative tilt with respect to the wavelength. The relationship may be acquired by, for example, performing a measurement using the Raman amplifier 1 and the optical transmission line 3. In this case, for example, the power ratio with which a Raman gain with a specified tilt with respect to a wavelength is obtained is searched for while adjusting the power of the pump light beams $\lambda$p1 through $\lambda$p4 respectively for a plurality of average Raman gain values. The relationship between the average Raman gain and the pump light power ratio may be acquired by another method. For example, the relationship may be obtained by a simulation and the like by considering the type, the material, and the like of the fiber of the optical transmission line 3.

Figure 12:
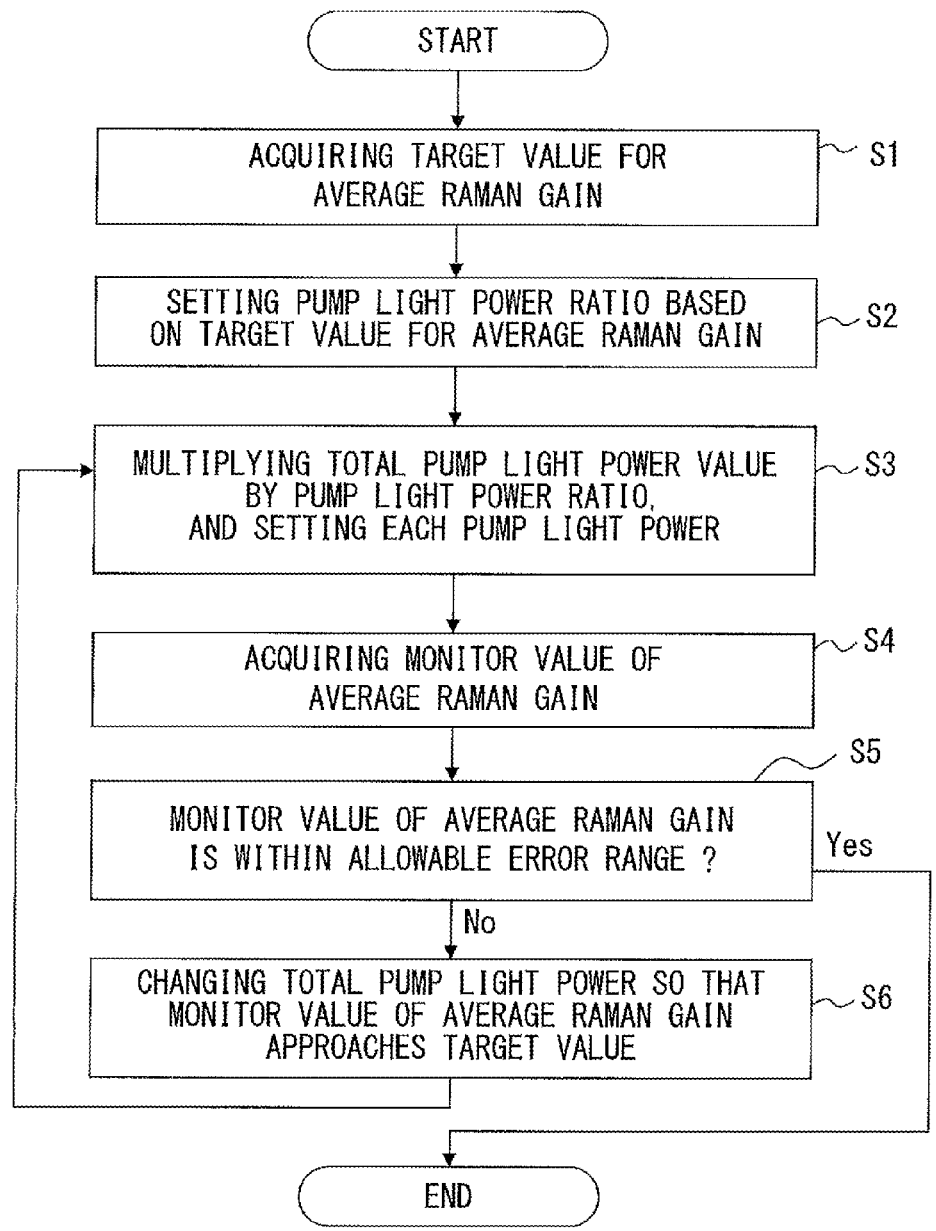
FIG. 12 is a flowchart of a gain control method used in the Raman amplifier illustrated in FIG. 5.

FIG. 12 is a flowchart of a gain control method used in the Raman amplifier illustrated in FIG. 5. The process of the flowchart is performed when, for example, the Raman amplifier 1 starts an operation. In addition, it is assumed that the power of the WDM optical signal when no pump light is provided for the optical transmission line 3 is measured in advance, and the Raman amplifier 1 memorizes the measured value.

In S1, the controller 40 acquires a target value for an average Raman gain. The target value for an average Raman gain is determined by, for example, a user of an optical transmission system or a network administrator.

In S2, the pump power ratio controller 42 determines the power ratio of a plurality of pump light beams $\lambda$p1 through λpn according to the target value for an average Raman gain. The memory 30 stores the ratio information indicating the power ratio of the pump light beams λp1 through λpn for an average Raman gain as an index. The pump power ratio controller 42 determines the pump light power ratio corresponding to the target value for an average Raman gain by accessing the memory 30.

In S3, the pump power controller 43 determines the power of each of the pump light beams λp1 through λpn by multiplying the total pump light power value by the pump light power ratio. As described later, the total pump light power value is calculated by the total pump power controller 41 in S6. Furthermore, the pump light power ratio is obtained in S2. The controller 40 drives the pump light sources 11-1 through 11-n to realize the power of each of the pump light beams λp1 through λpn calculated in S3.

In S4, the controller 40 acquires a monitor value of an average Raman gain. The average Raman gain is updated by controlling the power of the pump light beams λp1 through λpn in S3. Therefore, the controller 40 acquires the monitor value of the updated average Raman gain. The average Raman gain is measured by the Raman gain monitor 22.

In S5, the total pump power controller 41 calculates the difference between the monitor value of an average Raman gain and the target value for an average Raman gain. When the difference is within an allowable error range determined in advance, the gain control process terminates. On the other hand, the difference does not converge within the allowable error range determined, the gain control process moves to the process in S6.

In S6, the total pump power controller 41 updates the total pump light power value so that the monitor value of an average Raman gain may approach the target value for an average Raman gain. The processes in S3 through S6 are repeatedly performed until the difference between the monitor value of an average Raman gain and the target value for an average Raman gain converges within the allowable error range. Therefore, the average Raman gain for the WDM optical signal in the optical transmission line 3 is controlled as the target value.

Thus, in the gain control method according to the embodiment, the power ratio of a plurality of pump light beams is determined so that a requested gain characteristic may be obtained for an average Raman gain when the average Raman gain is controlled to be a target value. Therefore, although the average Raman gain by the Raman amplifier 1 is changed, a requested gain characteristic (for example, flat with respect to a wavelength) is obtained.

Figure 13:
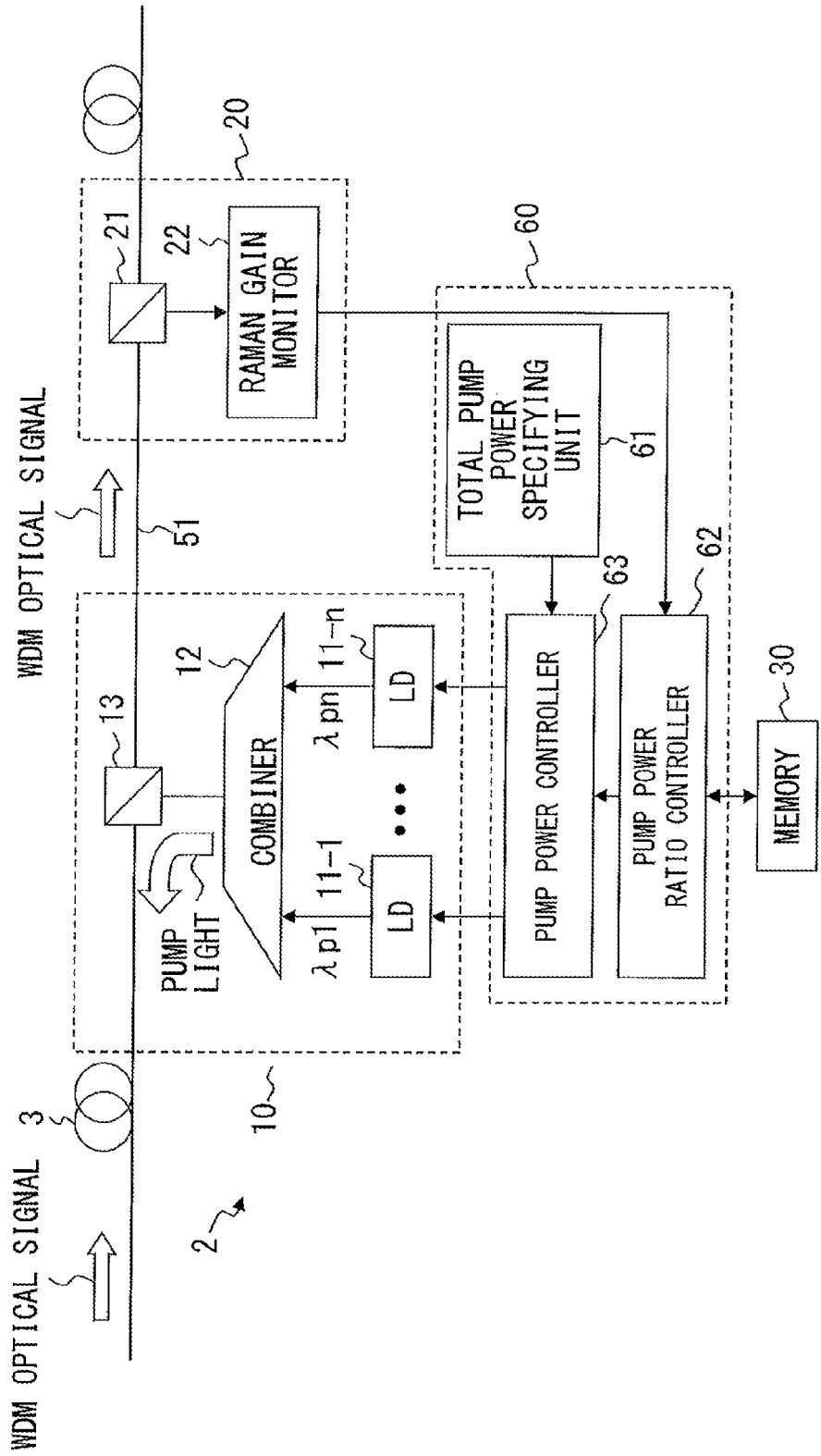
FIG. 13 illustrates a configuration of a Raman amplifier according to another embodiment of the present invention.

FIG. 13 is a configuration of a Raman amplifier according to another embodiment of the present invention. The Raman amplifier 1 illustrated in FIG. 5 amplifies the optical signal according to the target value of the specified average Raman gain. On the other hand, in the Raman amplifier 2 illustrated in FIG. 13, a total of the power of a plurality of pump light beams is specified. Then, the Raman amplifier 2 amplifies an optical signal depending on the specified total power.

As illustrated in FIG. 13, the Raman amplifier 2 includes the pump light generation unit 10, the gain monitor unit 20, the memory 30, and a controller 60. The pump light generation unit 10, the gain monitor unit 20, and the memory 30 are substantially the in FIG. 5 and FIG. 12, and thus the explanation is omitted here.

The controller 60 includes a total pump power specifying unit 61, an pump power ratio controller 62, and an pump power controller 63. The total pump power specifying unit 61 provides a specified total pump light power value for the pump power controller 63. The total pump light power value is specified by, for example, a user of an optical transmission system or a network administrator. The pump power ratio controller 62 acquires the ratio information corresponding to the average Raman gain measured by the Raman gain monitor 22 from the memory 30. The ratio information is similar to the information according to the embodiment illustrated in FIG. 5, and expresses the power ratio of the pump light beams λp1 through λpn. The pump power controller 63 calculates the power of each of the pump light beams λp1 through λpn according to the ratio information corresponding to the total pump light power value given by the total pump power specifying unit 61 and the average Raman gain.

Figure 14:
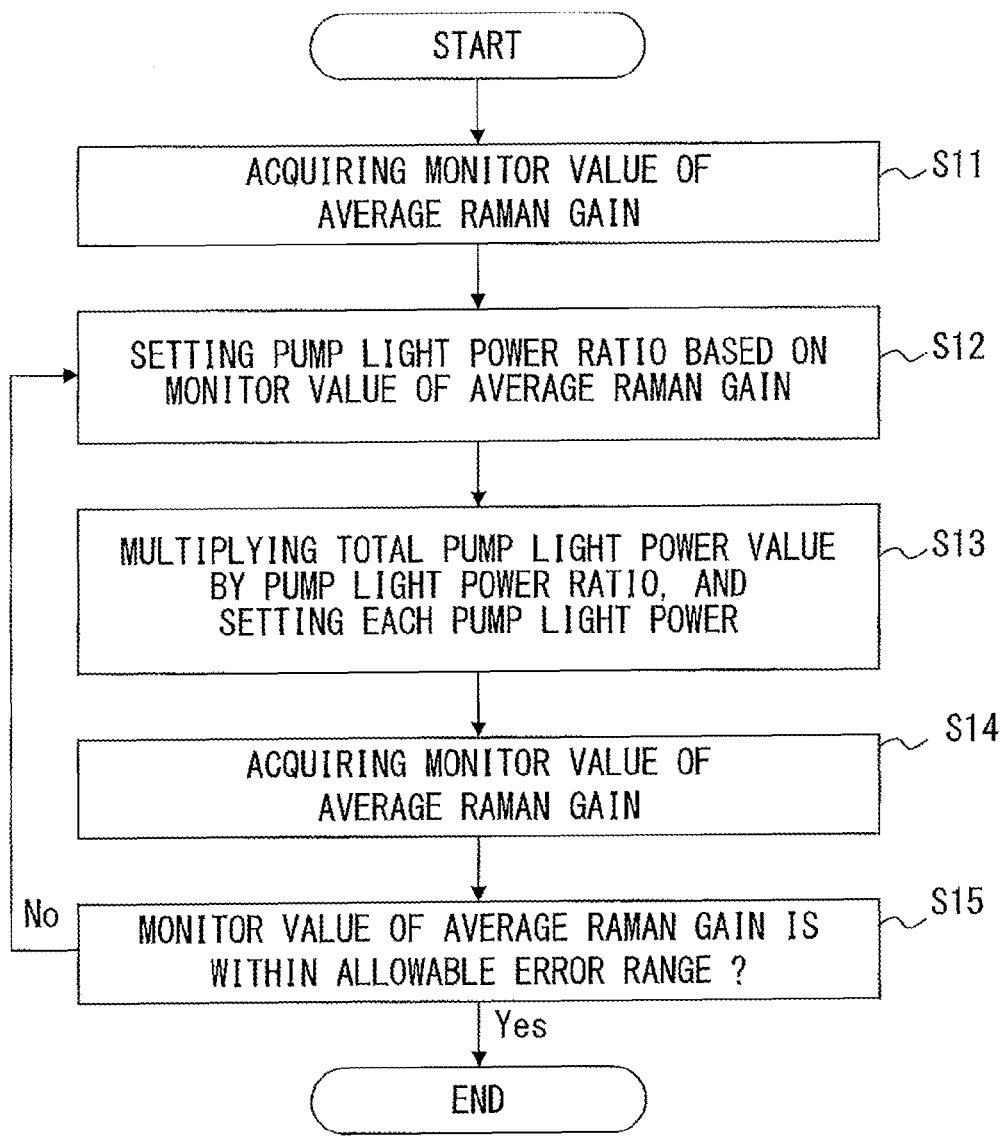
FIG. 14 is a flowchart of a gain control method used in the Raman amplifier illustrated in FIG. 13.

FIG. 14 is a flowchart of the gain control method used in the Raman amplifier 2 illustrated in FIG. 13. The process of the flowchart is performed when, for example, the Raman amplifier 2 starts an operation.

In S11, the controller 60 acquires a monitor value of an average Raman gain. The average Raman gain is measured by the Raman gain monitor 22.

In S12, the pump power ratio controller 62 determines the power ratio of a plurality of pump light beams λp1 through λpn based on the monitor value of the average Raman gain measured by the Raman gain monitor 22. The memory 30 stores the ratio information indicating the power ratio of the pump light beams λp1 through λpn for the average Raman gain as an index. The pump power ratio controller 62 determines the power ratio corresponding to the monitor value of an average Raman gain by accessing the memory 30.

In S13, the pump power controller 63 determines the power of each of the pump light beams λp1 through λpn by multiplying the total pump light power value by the pump light power ratio. The total pump light power value is a constant given by the total pump power specifying unit 61. Then, the controller 60 drives the pump light sources 11-1 through 11-n to realize the power of each of the pump light beams λp1 through λpn obtained in S13.

In S14, the controller 60 acquires the monitor value of an average Raman gain. The average Raman gain obtained in S14 is updated by controlling the power of the pump light beams λp1 through λpn in S13. Therefore, the controller 60 acquires the monitor value of the updated average Raman gain.

In S15, the pump power ratio controller 62 calculates the difference between the previous average Raman gain and the current average Raman gain. The process loop in S12 through S15 is repeatedly performed. Therefore, the "previous average Raman gain" indicates the average Raman gain measured in the previous process loop, and the current average Raman gain indicates the average Raman gain newly measured in the current process loop. When the difference does not converge within the allowable error range determined in advance, the gain control process is returned to S12. On the other hand, when the difference converges within the allowable error range, the gain control process terminates. After the average Raman gain converges, the average Raman gain for the WDM optical signal in the optical transmission line 3 corresponds to the specified total pump light power value.

As Described, in the embodiment illustrated in FIG. 13 and FIG. 14, the processes in S12 through S15 are repeatedly performed until the average Raman gain converges. When S12 is performed after S15, the pump power ratio controller 62 determines the power ratio of the pump light beams λp1 through λpn based on the newly measured average Raman gain. Therefore, the controller 60 may generate a Raman gain which corresponds to a specified total pump light power value and has a requested gain characteristic (for example, flat with respect to a wavelength).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A Raman amplifier, comprising:
    a plurality of semiconductor lasers that respectively provide a plurality of pump light beams with different wavelengths for an optical transmission medium;
    a gain monitor that monitors an average Raman gain in the optical transmission medium;
    a storage unit that stores ratio information indicating a power ratio of the plurality of pump light beams; and
    a controller that controls the power of the plurality of pump light beams based on the average Raman gain monitored by the gain monitor and the ratio information, wherein
    the ratio information indicates the power ratio of the plurality of pump light beams to obtain a specified gain characteristic with respect to the average Raman gain in the optical transmission medium for a range between a specified lower limit average Raman gain and a specified upper limit average Raman gain, indicates a first constant ratio of power of the plurality of pump light beams for a range where the average Raman gain is lower than the specified lower limit average Raman gain, and indicates a second constant ratio of power of the plurality of pump light beams for a range where the average Raman gain is higher than the specified upper limit average Raman gain.

2. The Raman amplifier according to claim 1, wherein the controller includes:
    a power ratio controller that determines the power ratio of the plurality of pump light beams; and
    a power controller that controls the power of the plurality of pump light beams based on the power ratio of the plurality of pump light beams determined by the power ratio controller so that the average Raman gain monitored by the gain monitor approaches a target value for an average Raman gain.

3. The Raman amplifier according to claim 1, wherein the controller includes:
    a power ratio controller that determines the power ratio of the plurality of pump light beams based on the average Raman gain monitored by the gain monitor and the ratio information; and
    a power controller that controls the power of the plurality of pump light beams based on the power ratio of the plurality of pump light beams determined by the power ratio controller so that total power of the plurality of pump light beams approaches a specified value.

4. The Raman amplifier according to claim 1, wherein the ratio information indicates the ratio of the power of the plurality of pump light beams that makes a Raman gain in the optical transmission medium be flat or substantially flat with respect to a wavelength.

5. The Raman amplifier according to claim 1, wherein the ratio information indicates the ratio of the power of the plurality of pump light beams that makes a Raman gain in the optical transmission medium have a specified tilt with respect to a wavelength.

6. A method for controlling a gain, comprising:
    providing a plurality of pump light beams with different wavelengths for an optical transmission medium; using a plurality of semiconductor laser;
    monitoring an average Raman gain in the optical transmission medium; and
    controlling power of the plurality of pump light beams based on ratio information indicating a power ratio of the plurality of pump light beams and the monitored average Raman gain, wherein
    the ratio information indicates the power ratio of the plurality of pump light beams to obtain a specified gain characteristic with respect to the average Raman gain in the optical transmission medium for a range between a specified lower limit average Raman gain and a specified upper limit average Raman gain, indicates a first constant ratio of power of the plurality of pump light beams for a range where the average Raman gain is lower than the specified lower limit average Raman gain, and indicates a second constant ratio of power of the plurality of pump light beams for a range where the average Raman gain is higher than the specified upper limit average Raman gain.

* * * * *